US011010446B2

(12) United States Patent
Jaiswal et al.

(10) Patent No.: US 11,010,446 B2
(45) Date of Patent: May 18, 2021

(54) INTELLIGENT FEEDBACK AND CONTEXT DRIVEN WEB NAVIGATION

(71) Applicant: INTERNATIONAL BUSINESS MACHINES CORPORATION, Armonk, NY (US)

(72) Inventors: Priyansh Jaiswal, Boca Raton, FL (US); Shikhar Kwatra, Durham, NC (US); Sushain Pandit, Austin, TX (US); Peeyush Jaiswal, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 148 days.

(21) Appl. No.: 16/116,881

(22) Filed: Aug. 29, 2018

(65) Prior Publication Data

US 2020/0074011 A1 Mar. 5, 2020

(51) Int. Cl.
*G06F 16/957* (2019.01)
*G06N 20/00* (2019.01)
*G06F 16/955* (2019.01)
*G06F 16/9535* (2019.01)
*G06F 40/20* (2020.01)

(52) U.S. Cl.
CPC .......... *G06F 16/957* (2019.01); *G06F 16/955* (2019.01); *G06F 16/9535* (2019.01); *G06F 40/20* (2020.01); *G06N 20/00* (2019.01)

(58) Field of Classification Search
CPC .. G06F 16/957; G06F 16/955; G06F 16/9535; G06F 40/20; G06N 20/00
See application file for complete search history.

(56) References Cited

U.S. PATENT DOCUMENTS

| 8,271,878 | B2 | 9/2012 | Kane et al. | |
| 8,442,940 | B1* | 5/2013 | Faletti | G06F 40/30 |
| | | | | 707/610 |
| 8,984,048 | B1* | 3/2015 | Maniscalco | H04L 67/10 |
| | | | | 709/203 |
| 2005/0144297 | A1* | 6/2005 | Dahlstrom | H04L 63/101 |
| | | | | 709/229 |

(Continued)

FOREIGN PATENT DOCUMENTS

WO 2013098830 A1 7/2013

OTHER PUBLICATIONS

Coppola et al., "Context-Aware Browser," Dagstuhl Seminar Proceedings 09101, Interactive Information Retrieval, 2009 (23 pages).

*Primary Examiner* — Jay A Morrison
(74) *Attorney, Agent, or Firm* — Griffiths & Seaton PLLC

(57) ABSTRACT

Embodiments for implementing intelligent web navigation by at least a portion of a processor. One or more uniform resource locators (URLs) may be accessed (e.g., opened) according a user history of Internet activities, user preferences, one or more current user activities, calendar data, or a combination thereof. Selected feedback may be gathered (e.g., collected) from the user relating to the one or more URLs according to activities of the user performed on the one or more URLs. The one or more URLs may be classified into one of a plurality of classifications to indicate a degree of relevancy to the user.

18 Claims, 6 Drawing Sheets

(56) References Cited

U.S. PATENT DOCUMENTS

| | | | |
|---|---|---|---|
| 2006/0277308 A1* | 12/2006 | Morse | G06Q 30/0259 709/227 |
| 2009/0006974 A1* | 1/2009 | Harinarayan | G06F 16/9535 715/738 |
| 2009/0216749 A1* | 8/2009 | Hardt | G06Q 30/02 |
| 2010/0223105 A1* | 9/2010 | Gassewitz | G06Q 30/02 705/7.29 |
| 2010/0241663 A1* | 9/2010 | Huang | H04M 1/575 707/575 |
| 2012/0167010 A1* | 6/2012 | Campbell | G06F 3/0482 715/825 |
| 2013/0166525 A1 | 6/2013 | Naranjo et al. | |
| 2018/0033040 A1 | 2/2018 | Minnis et al. | |

\* cited by examiner

INTELLIGENT FEEDBACK AND CONTEXT DRIVEN WEB NAVIGATION

BACKGROUND OF THE TECHNOLOGY

Field of the Technology

The present technology relates in general to computing systems, and more particularly to, various embodiments for implementing an intelligent feedback and context driven web navigation using a computing processor.

Description of the Related Art

In today's society, consumers, business persons, educators, and others use various computing network systems with increasing frequency in a variety of settings. A popular forum for world-wide data communication linking together computers on a global basis is the Internet. Generally, an internet Web page's address or uniform resource locator ("URL:) is made up of the name of the server along with the path to the file or the server. Rather than using a Web hosting service's server name as their URL, most companies and many individuals and other entities prefer a "domain name" of their own choosing. A domain name is a meaningful and easy-to-remember "handle" for an Internet address. The domain name system (DNS) is a name resolution protocol through which Internet domain names are located and translated into Internet Protocol addresses. DNS converts host names to IP addresses and vice-versa. Each domain is managed by a DNS name server, which is a server that contains the host name information about the hosts and sub-domains within its domain.

SUMMARY OF THE TECHNOLOGY

Various embodiments for implementing an intelligent feedback and context driven web navigation by at least a portion of one or more processors, are provided. In one embodiment, by way of example only, a method for implementing intelligent web navigation in a computing network, again by a processor, is provided. One or more uniform resource locators (URLs) may be accessed (e.g., opened) according a user history of Internet activities, user preferences, one or more current user activities, calendar data, or a combination thereof. Selected feedback may be gathered (e.g., collected) from the user relating to the one or more URLs according to activities of the user performed on the one or more URLs. The one or more URLs may be classified into one of a plurality of classifications to indicate a degree of relevancy to the user.

BRIEF DESCRIPTION OF THE DRAWINGS

In order that the advantages of the technology will be readily understood, a more particular description of the technology briefly described above will be rendered by reference to specific embodiments that are illustrated in the appended drawings. Understanding these drawings depict only typical embodiments of the technology and are not therefore to be considered to be limiting of its scope, the technology will be described and explained with additional specificity and detail through the use of the accompanying drawings, in which.

DETAILED DESCRIPTION OF THE DRAWINGS

Figure 1:
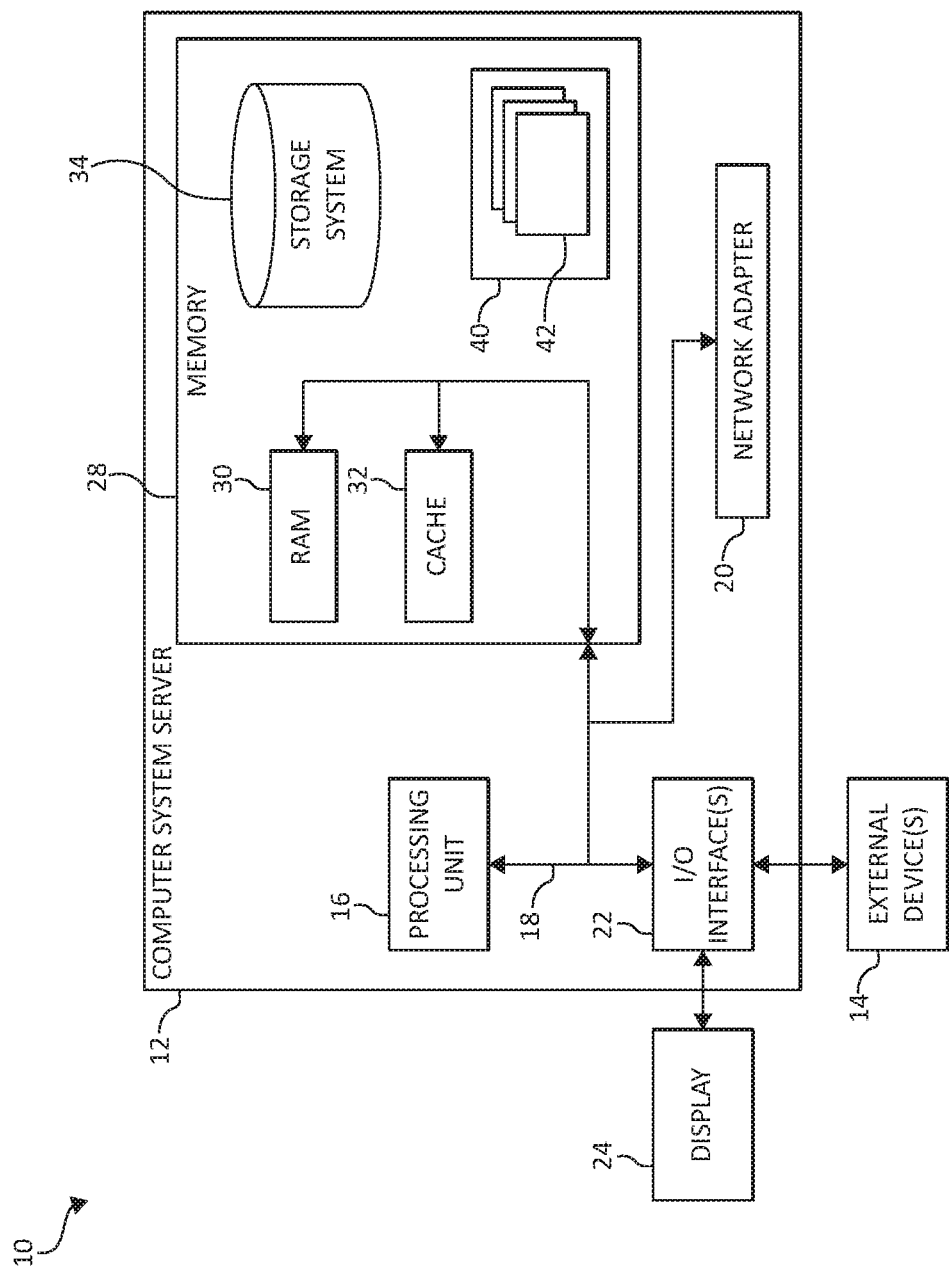
FIG. 1 is a block diagram depicting an exemplary cloud computing node according to an embodiment of the present technology.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

Web browsers provide one of the most popular ways to access the internet. Broadly, a web browser is a computer program that provides a user friendly, graphical interface to display the contents of internet world wide web pages ("web pages"). Web browser software directs the user's computer to play sounds, run programs, download software, and display text, graphics, and video. Although invisible to the computer user, web browsers actually operate by retrieving and then executing a web site's underlying program content, which takes the form of hypertext markup language ("HTML") or a similar language.

When displayed by a web browser, most web pages contain one or more "hyperlinks." From the user's perspective, a hyperlink is an on-screen input mechanism, serving an analogous function as a switch, dial, or other physical input apparatus. Hyperlinks or "links" are often implemented as graphics icons or text strings. The user activates the hyperlink by operating his/her mouse to place the cursor over the hyperlink and then "clicking" a mouse button; in response, the web browser causes some action to be performed. When a user opens a webpage, the user needs to perform the operation by explicitly clicking on the web pages/hyperlinks of his or her choice. Such tasks may be time consuming and inefficient. Accordingly, a need exists to provide for monitoring and tracking the user's activity and work task assignments, which can dynamically launch relevant webpages for the user based on the user's activities in conjunction with the schedule of the user, thereby reducing the time and effort spent by the user in manually looking over the relevant information on a particular webpage.

Accordingly, the present invention provides a cognitive system for implementing intelligent web navigation in a computing network. One or more uniform resource locators (URLs)/hyperlinks may be accessed (e.g., opened) according a user history of Internet activities, user preferences, current user activities, calendar data, or a combination thereof. Selected feedback may be gathered (e.g., collected) from the user relating to the one or more URLs/hyperlinks according to activities of the user performed on the one or more URLs. The one or more URLs/hyperlinks may be classified into one of a plurality of classifications to indicate a degree of relevancy to the user. User preferences may be considered along with contextual awareness for automatically launching desired URLs/hyperlinks while restricting undesired URLs/hyperlinks from being opened (e.g., phishing, malware, etc.). A machine learning operation may be initiated to learn and improve its understanding of when a URL/hyperlink is "relevant" to a user based on implicit and/or explicit user feedback.

It should be noted as described herein, the term "cognitive" (or "cognition") may be relating to, being, or involving conscious intellectual activity such as, for example, thinking, reasoning, or remembering, that may be performed using machine learning. In an additional aspect, cognitive or "cognition" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor-based devices or other computing systems that include audio or video devices). Cognitive may also refer to identifying patterns of behavior, leading to a "learning" of one or more problems, domains, events, operations, or processes. Thus, the cognitive model may, over time, develop semantic labels to apply to observed behavior, domains, problems, and use a knowledge domain or ontology to store the learned observed behavior, problems, and domain. In one embodiment, the system provides for progressive levels of complexity in what may be learned from the one or more dialogs, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identifying problems, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the technology described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the technology.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the technology as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
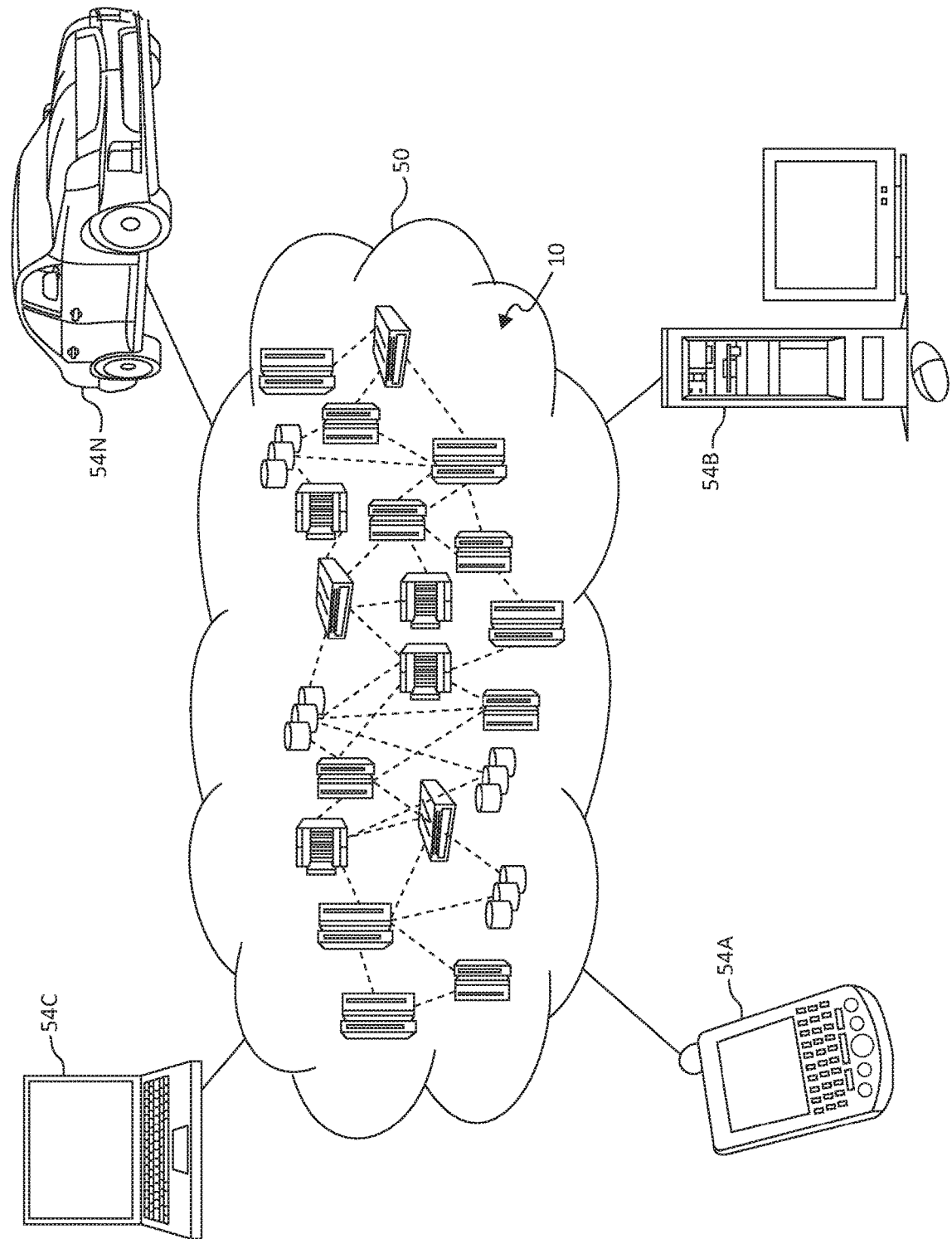
FIG. 2 is an additional block diagram depicting an exemplary cloud computing environment according to an embodiment of the present technology.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
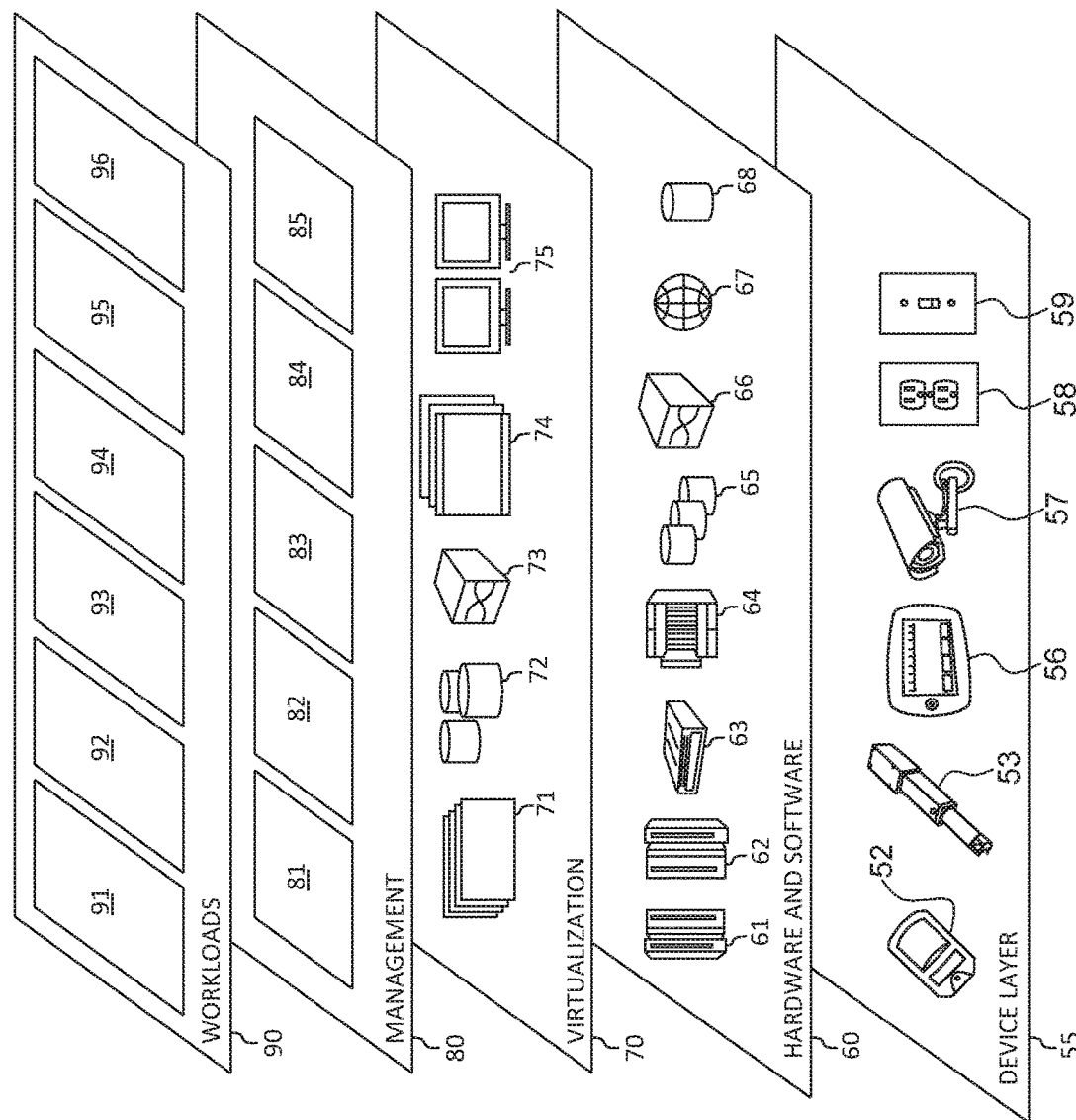
FIG. 3 is an additional block diagram depicting abstraction model layers according to an embodiment of the present technology.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the technology are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "interne of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provide examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and, in the context of the illustrated embodiments of the present technology, various intelligent feedback and context driven web navigation workloads and functions 96. In addition, intelligent feedback and context driven web navigation workloads and functions 96 may include such operations as implementing URL's/domain names functionality, data analysis, predictive operations, cognitive web navigation, machine learning operation, comparison and matching analytics, feedback collection, and other functionality. One of ordinary skill in the art will appreciate that the intelligent feedback and context driven web navigation workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present technology.

As previously mentioned, the mechanisms of the illustrated embodiments provide novel approaches for implementing cognitive web navigation that automatically opens webpages/hyperlinks on a web page when a user first opens an initial web page based on relevance and context. A user history, user preferences, and/or current state of actions being undertaken by the user may be considered. For example, if a user is preparing a presentation on "topic A" and if the user opens a webpage within the same context (e.g., within the same terminal, within the same session, on the same device, etc.), then one or more webpages/hyperlinks relevant to "topic A" should automatically be opened. A blacklist(s) and a list of user preference(s) may be maintained to filter out undesired webpages/hyperlinks (e.g., phishing, malware, etc.). Explicit feedback (in the form of a rating system) and/or implicit feedback (in the form of tracking user actions on the auto opened webpages) may be collected to learn and improve an internal cognitive model that determines when to access and/or automatically open a link.

Figure 4:
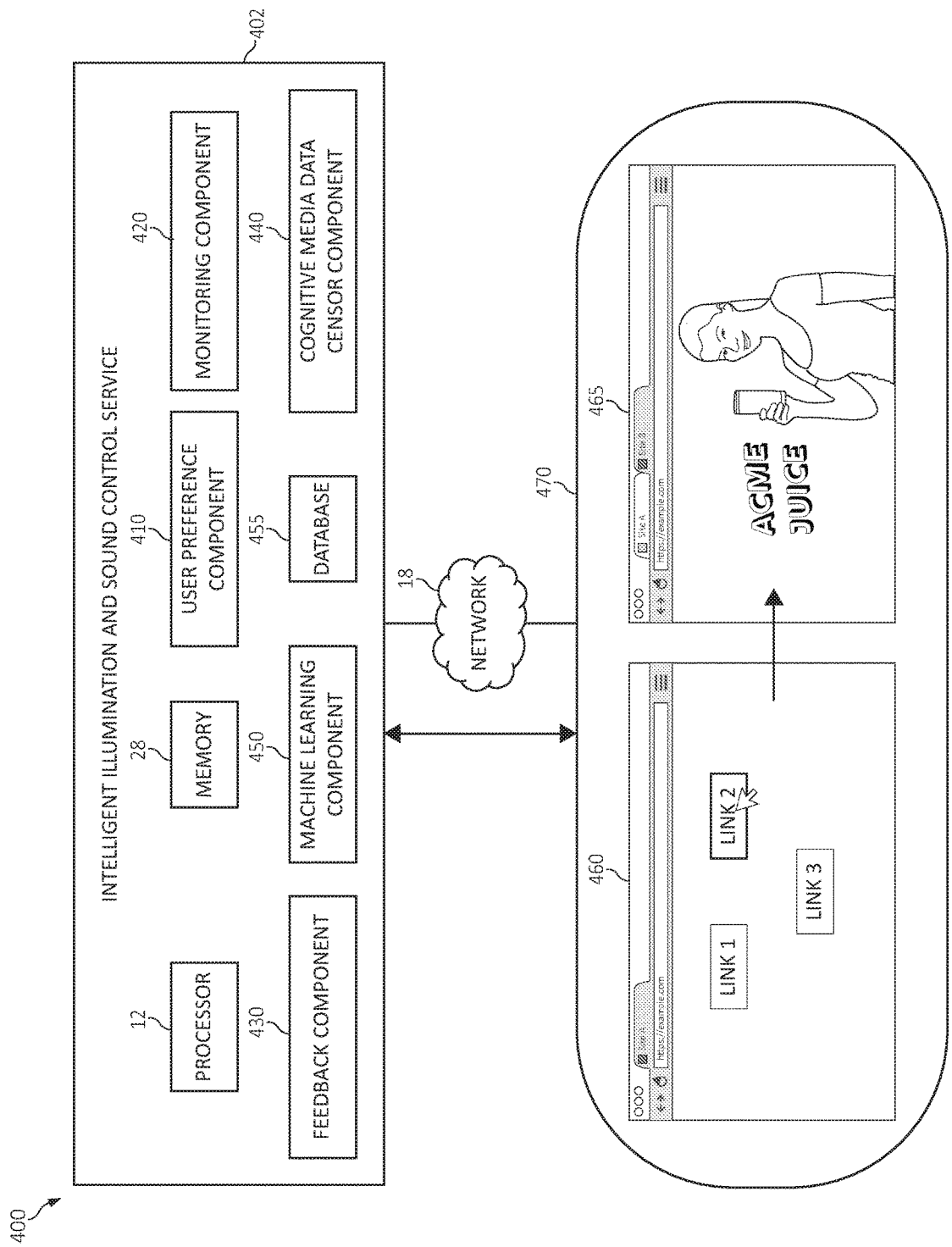
FIG. 4 is an additional block diagram depicting various user hardware and cloud computing components functioning in accordance with aspects of the present technology.

Turning now to FIG. 4, a block diagram of a computing system 400 depicting exemplary functional components of computing system 400 (e.g., a cognitive system) according to various mechanisms of the illustrated embodiments, is shown. FIG. 4 illustrates one or more functions, workloads, and/or protocols for intelligent feedback and context driven web navigation. In one aspect, each of the components, modules, and/or functions described in FIGS. 1-3 may also apply to the components, modules, and functions of FIG. 4. For example, processing unit 12 ("processor") and memory 28 of FIG. 1 may be employed in FIG. 4 to perform various computational, data processing, storage and other functionality in accordance with various aspects of the present invention.

The intelligent feedback and context driven web navigation service 402 and an IoT computing device 470 (e.g., a smart phone, computer, laptop, tablet, etc.) may each be associated with and/or in communication with each other, by one or more communication methods, such as a computing network, wireless communication network, or other network means enabling communication (each collectively referred to in FIG. 4 as "network 18"). In one aspect, the intelligent feedback and context driven web navigation service 402 may be installed locally on the IoT computing device 470. Alternatively, the intelligent feedback and context driven web navigation service 402 may be located external to the IoT computing device 470 (e.g., via a cloud computing server).

Moreover, the intelligent feedback and context driven web navigation service 402 may provide virtualized computing services (i.e., virtualized computing, virtualized storage, virtualized networking, etc.). More specifically, the intelligent feedback and context driven web navigation service 402 may include and/or be associated with a virtual computing environment that provides virtualized computing, virtualized storage, virtualized networking and other virtualized services that are executing on a hardware substrate.

The cognitive system 400 may include functional components that may include the intelligent feedback and context driven web navigation service 402, having a user preference component 410, a monitoring component 420, a feedback component 430, a web navigation component 440, a machine learning module 450, a database 455, each of which may work in communication with each other.

The user preference component 410 may collect user preference from the user prior to accessing one or more URLs/hyperlinks. The collected user preferences may be stored for each user in a user profile stored in database 455. In one aspect, the database 455 may include one or more preferences and interests of each user. The database may also be/include a domain knowledge, which may be an ontology of concepts, keywords, expressions representing a domain of knowledge. A thesaurus or ontology may be used as the database 455 and may also be used to identify semantic relationships between observed and/or unobserved variables by the machine learning component 450 (e.g., a cognitive component). In one aspect, the term "domain" is a term intended to have its ordinary meaning. In addition, the term "domain" may include an area of expertise for a system or a collection of material, information, content and/or other resources related to a particular subject or subjects. A domain can refer to information related to any particular subject matter or a combination of selected subjects.

The term ontology is also a term intended to have its ordinary meaning. In one aspect, the term ontology in its broadest sense may include anything that can be modeled as an ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Additionally, the domain knowledge may include one or more external resources such as, for example, links to one or more Internet domains, webpages, and the like. For example, text data may be hyperlinked to a webpage that may describe, explain, or provide additional information relating to the text data. Thus, a summary may be enhanced via links to external resources that further explain, instruct, illustrate, provide context, and/or additional information to support a decision, alternative suggestion, alternative choice, and/or criteria.

In one aspect, the one or more preferences and interests of the user relating to various topics may be received or collected via the user preference component 410 from activities associated with Internet activities. The preferences and interests may also be learned via a machine learning operation via the machine learning component 450. The preferences and interests may include, for example, a user profile (which may include preferences, interests, concerns, activities of daily living "ADLs," and such for each user), historical activity patterns of the user in relation to activities of Internet activities. The preferences and interests may also be stored with a keyword dictionary or ontology (e.g., a lexical database ontology), which may be associated with the central server, the cloud computing network, the local area network server, and/or the intelligent feedback and context driven web navigation service 402.

The web navigation component 440 may access one or more uniform resource locators (URLs) according a user history of Internet activities, user preferences, one or more current user activities, calendar data, or a combination thereof. The web navigation component 440 may classify the one or more URLs into one of a plurality of classifications to indicate a degree of relevancy to the user. The web navigation component 440 may identify the one or more URLs according schedule data of the user, a user calendar, ADLs, one or more IoT devices associated with the user. The web navigation component 440 may select the one or more URLs/hyperlinks linked within an alternative URLs/hyperlinks according to one or more user preferences. For example, consider a user using a computing device 470 in communication with the intelligent feedback and context driven web navigation service 402, to select and open a URL 460 (e.g., webpage 460) that may include hyperlink 1 ("link 1"), hyperlink 2 ("link 2"), and hyperlink 3 ("link 3"). Assume also the user interacts with link 2 showing a level of interest such as, for example, by placing a cursor over the link 2. Accordingly, the web navigation component 440 may automatically open the link 2 as URL 465 (e.g., webpage 465).

The feedback component 430 may collect/gather selected feedback from the user relating to the one or more URLs according to activities of the user performed on the one or more URLs. The feedback may be collected and stored in the database 455 for use by the machine learning component 450.

The machine learning component 450 may use natural language processing (NLP) on text data from one or more data sources to identify an interest level of a user relating to concepts, events, relationships, or a combination thereof. In one aspect, the NLP based keyword extraction may be used for extracting and storing relevant topics of interest. The machine learning component 450 may initiate a machine learning operation using the selected feedback to learn and train a machine learning model for classifying the one or more URLs into one of the plurality of classifications. The web navigation component 440, in association with the machine learning component 450, may dynamically open or close the one or more URLs or hyperlinked URLs according to the classifying.

In one aspect, the machine learning module 450 may include using one or more heuristics and machine learning based models for performing one or more of the various aspects as described herein. In one aspect, the IoT device compliance service and machine learning based models may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

In view of the various components and functionality of FIGS. 1-4, consider the following operational and implementation examples. In step 1, the web navigation component 440 keeps track of the webpages that a user visits and the webpages/links that are clicked/selected by the user. In step 2) the web navigation component 440 also keeps track of the following activities such as, for example: activities the user is currently doing (e.g., giving presentation and on a selected topic), audio/video conversations on intranet chat client, content of an email the user is currently reading, current webpages being viewed by the user and the respective metadata including the time and topic of the content, monitoring activities on mobile device, and/or monitoring a user's calendar has for an upcoming meeting for links about the meeting's topic.

In step 3) the web navigation component 440 maintains a user preference configuration, which a user is allowed to fine-tune manually at a beginning of system operation. In a preferred configuration, the user may be allowed to specify criteria when a content item and/or a certain media type/content item should never be automatically opened and when content item and/or a certain media type/content should always be automatically opened, and when the system should use its internal cognitive model to determine what to do (e.g., automatically open). In step 4) when the user opens a new page, all links relevant to the points 1 and 2, for example, that are allowed through the preferences may be automatically opened. In step 5) the web navigation component 440 pre-loads webpage content behind the links on the page, analyzes and decides whether or not the webpages are relevant to a user in relation to the user preferences and the activities mentioned in step 2. In step 5) during an initial phase, when the web navigation component 440 does not have enough examples for learning, the web navigation component 440 determines a a degree of "relevance" (in step 4) based on steps 1, 2 and 3. After the web links are automatically opened, the system tracks user actions to gather implicit feedback. For instance, if the user immediately (e.g., in less than 5 seconds) closes a select number of links (e.g., 4 out of 5) opened links, then the underlying recommendation provided by the web navigation component 440 may be considered a false positive, in that the web navigation component 440 failed to determine relevance.

In step 6) the web navigation component 440 may also gather explicit feedback (in case there is no discernible implicit feedback based on user actions). For explicit feedback, the system display/pop up a ratings dialog (e.g., stars, good/ok/bad, etc.). In step 7) once there are enough labeled examples from steps 5 and 6 (e.g., a select number of labeled examples above a defined threshold), a machine learning model may be trained to learn when to classify a webpage/link into relevant classes such as, for example, classifications listed as: a) high_relevance, b) medium_relevance, c) low_relevance, etc. That is, machine learning model learns and establishes a correlation between user's interests and web pages based on training a multi-layer neural network model using explicit feedback from the user and/or implicit feedback by tracking user actions. The implicit feedback includes tracking the time and the type of webpages and links opened by the user for feeding back to the training machine learning model.

In step 8) upon completion of step 7, the machine learning model may be utilized in addition to steps 1, 2 and 3 to determine whether a link on a page is relevant or irrelevant to the user to increase the prediction accuracy of opening a relevant webpage/link for the user. In one aspect, a weighted operation may be employed for the classifying (e.g., there are different weights assigned on different input parameters that are being used to determine the relevancy of a link or a webpage).

It should be noted that the relevant links of interest are selected based on monitoring user's calendar, daily schedule, planned meetings etc. on all the linked devices. Using an NLP operation (e.g., semantic similarity), the present invention locates and identifies similarities between relevant concepts, events, and relationships to the user. For example, a user's calendar may be parsed and to detect relevant concepts, events and relationships. The concepts, events and relationships may be mapped into a list of predefined topic areas. The topic areas may be utilized to determine proximity of user interest with the content behind web links. The proximity of user interest may be determined through various cognitive operations such as, for example, a frequency distribution of terms and key concepts using a term-frequency-inverse document frequency (e.g., "Tf-idf") vectors, and/or other term vector based similarity operations. A Tf-idf is an operation that measures an importance of words in a collection of documents. Said differently, the Tf-idf is a numerical statistic that is intended to reflect how important a word is to a document in a collection or corpus. The Tf-idf operation may provide Tf-idf vector representations of entity descriptions and the vectors may be compared to identify similarities between the documents, which are then used to establish/determine similarities between existing client entities and a given prospect client entity.

Figure 5:
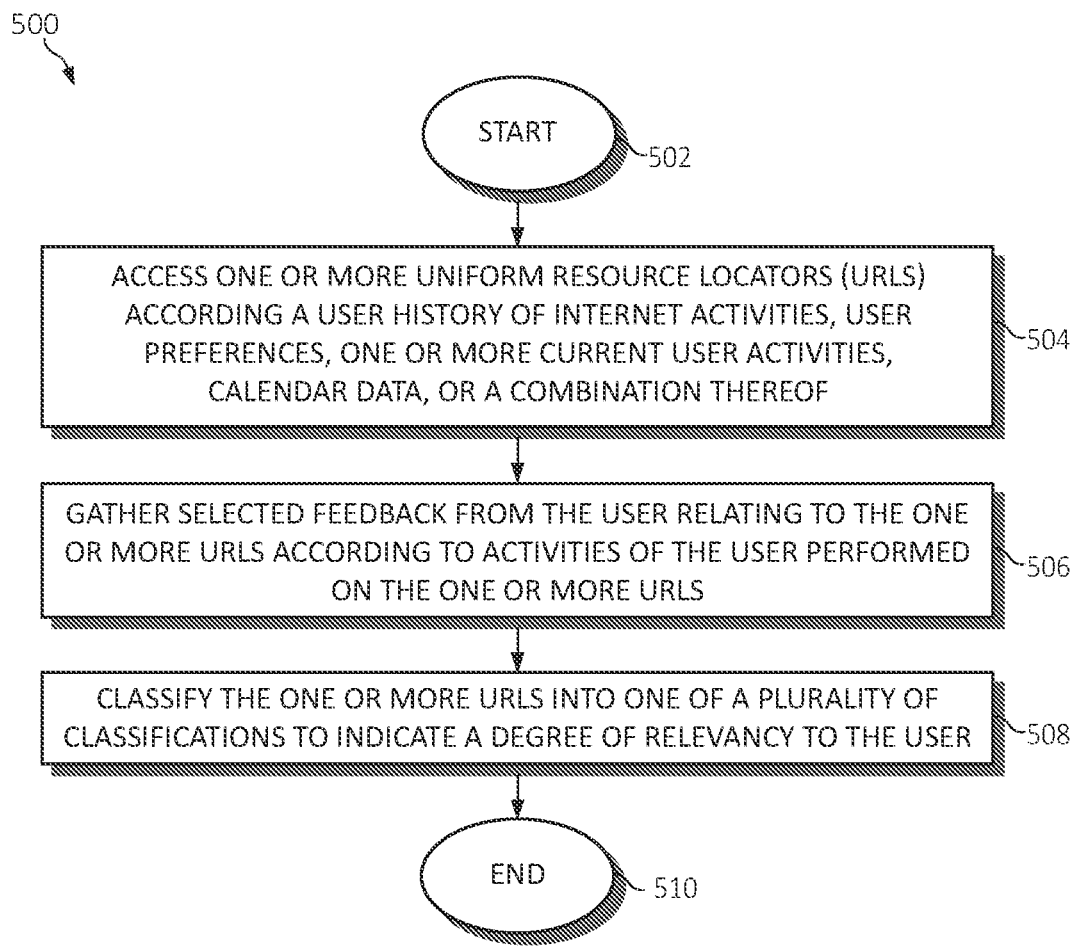
FIG. 5 is a flow diagram depicting an exemplary method for implementing an intelligent feedback and context driven web navigation in which aspects of the present technology may be realized.

FIG. 5 is a flow chart diagram depicting an exemplary method for implementing an intelligent feedback and context driven web navigation by a processor, in which aspects of the present invention may be realized. The functionality 500 may be implemented as a method executed as instructions on a machine, where the instructions are included on at least one computer readable medium or one non-transitory machine-readable storage medium.

The functionality 500 may start in block 502. One or more uniform resource locators (URLs) may be accessed (e.g., opened) according a user history of Internet activities, user preferences, one or more current user activities, calendar data, or a combination thereof, as in block 504. Selected feedback may be gathered (e.g., collected) from the user relating to the one or more URLs according to activities of the user performed on the one or more URLs, as in block 506. The one or more URLs may be classified into one of a plurality of classifications to indicate a degree of relevancy to the user, as in block 508. The functionality 500 may end, as in block 510.

Figure 6:
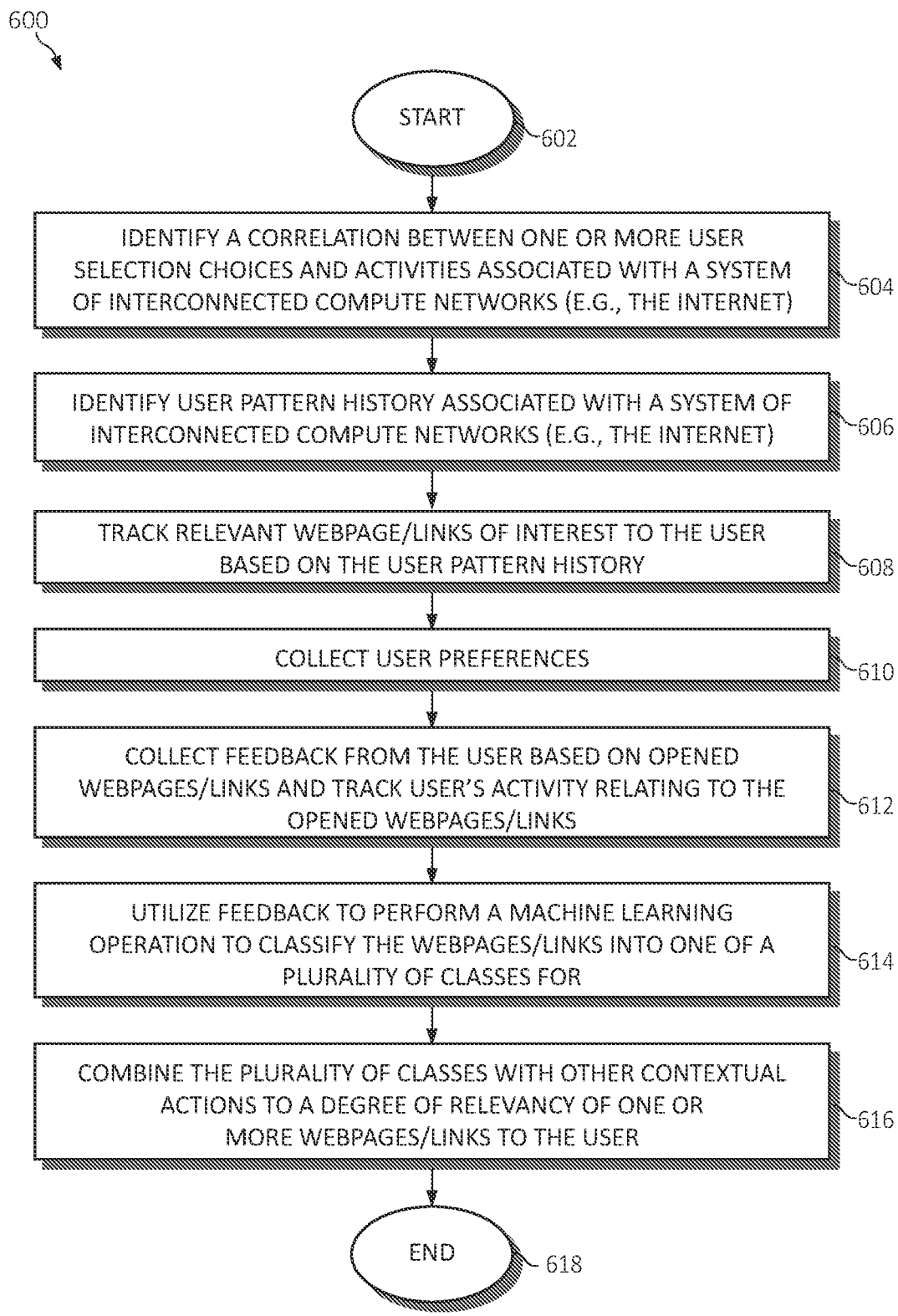
FIG. 6 is a flowchart diagram depicting an additional exemplary method for implementing an intelligent feedback and context driven web navigation by a processor, again in which aspects of the present technology may be realized.

FIG. 6 is a flow chart diagram depicting an exemplary method for implementing an intelligent feedback and context driven web navigation by a processor, in which aspects of the present invention may be realized. The functionality 600 may be implemented as a method executed as instructions on a machine, where the instructions are included on at least one computer readable medium or one non-transitory machine-readable storage medium.

The functionality 600 may start in block 602. A user pattern history associated with a system of interconnected compute networks (e.g., the Internet) may be identified, as in block 604. That is, a correlation between one or more user selection choices and activities associated with a system of interconnected computer networks (e.g., the Internet) may be identified. One or more relevant webpage/links of interest to the user may be identified based on the user pattern history, as in block 606. One or more user preferences may be collected, as in block 608. Feedback may be collected from the user based on opened webpages/links and track user's activity relating to the opened webpages/links, as in block 610. Feedback may be utilized to perform a machine learning operation to classify the webpages/links into one of a plurality of classes relating to a degree of relevancy of one or more webpages/links to the user, as in block 612. The plurality of classes may be combined with other contextual actions to enhance the degree of relevancy of one or more webpages/links to the user, as in block 614. That is, the degree of relevancy is based on input vectors as described herein that includes feedback from the user and monitoring various sources that are fed into the machine learning system. The functionality 600 may end, as in block 616.

In one aspect, in conjunction with and/or as part of at least one block of FIGS. 5 and 6, the operations of methods 500 and 600 may include each of the following. The operations of methods 500 and 500 may include collecting user preference from the user prior to accessing one or more URLs (e.g., webpages/links). One or more URLs may be identified according schedule data of the user, a user calendar, ADLs, one or more IoT devices associated with the user.

The operations of methods 500 and 600 may use NLP on text data from one or more data sources to identify an interest level of a user relating to concepts, events, relationships, or a combination thereof. One or more URLs linked within an alternative URL may be selected according to one or more user preferences.

The operations of methods 500 and 600 may initialize a machine learning operation using the selected feedback to learn and train a machine learning model for classifying the one or more URLs into one of the plurality of classifications. The operations of methods 500 and 600 may dynamically open or close the one or more URLs or hyperlinked URLs according to the classifying.

The present technology may be a system, a method, and/or a computer program product. The computer program product may include a computer readable storage medium (or media) having computer readable program instructions thereon for causing a processor to carry out aspects of the present technology.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technology.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present technology. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for implementing intelligent web navigation in a computing network, comprising:
   accessing one or more uniform resource locators (URLs) according to a user history of Internet activities, user preferences, one or more current user activities, calendar data, or a combination thereof;
   gathering selected feedback from a user relating to the one or more URLs according to activities of the user performed on the one or more URLs;
   classifying the one or more URLs into one of a plurality of classifications to indicate a degree of relevancy to the user;
   dynamically opening or closing hyperlinked URLs within the one or more URLs according to the classifying, wherein dynamically opening the hyperlinked URLs includes, upon the one or more URLs being opened and prior to opening the hyperlinked URLs, preloading content behind the hyperlinked URLs contained within the one or more URLs and analyzing the content to determine the degree of relevancy to the user; and
   commensurate with gathering the selected feedback and subsequent to dynamically opening the hyperlinked URLs according to the analyzation of the content, determining a number of the hyperlinked URLs dynamically opened that the user subsequently closes within a predetermined timeframe, wherein, when the number of the hyperlinked URLs exceeds a predetermined value, the selected feedback includes an indication used during the classification that the degree of relevancy is invalid and failed to determine relevance for the number of the hyperlinked URLs.

2. The method of claim 1, further including collecting user preference from the user prior to accessing the one or more URLs.

3. The method of claim 1, further including identifying the one or more URLs according to schedule data of the user, a user calendar, activities of daily living (ADL), and data collected from one or more internet of things (IoT) devices associated with the user.

4. The method of claim 1, further including using natural language processing (NLP) on text data from one or more data sources to identify an interest level of a user relating to concepts, events, relationships, or a combination thereof.

5. The method of claim 1, further including selecting the one or more URLs linked within an alternative URL according to one or more user preferences.

6. The method of claim 1, further including initializing a machine learning operation using the selected feedback to learn and train a machine learning model for classifying the one or more URLs into one of the plurality of classifications.

7. A system for implementing intelligent web navigation in a computing environment, comprising:
   one or more computers with executable instructions that when executed cause the system to:
      access one or more uniform resource locators (URLs) according to a user history of Internet activities, user preferences, one or more current user activities, calendar data, or a combination thereof;
      gather selected feedback from a user relating to the one or more URLs according to activities of the user performed on the one or more URLs;
      classify the one or more URLs into one of a plurality of classifications to indicate a degree of relevancy to the user; and
      dynamically open or close hyperlinked URLs within the one or more URLs according to the classifying, wherein dynamically opening the hyperlinked URLs includes, upon the one or more URLs being opened and prior to opening the hyperlinked URLs, preloading content behind the hyperlinked URLs contained within the one or more URLs and analyzing the content to determine the degree of relevancy to the user; and
      commensurate with gathering the selected feedback and subsequent to dynamically opening the hyperlinked URLs according to the analyzation of the content, determine a number of the hyperlinked URLs dynamically opened that the user subsequently closes within a predetermined timeframe, wherein, when the number of the hyperlinked URLs exceeds a predetermined value, the selected feedback includes an indication used during the classification that the degree of relevancy is invalid and failed to determine relevance for the number of the hyperlinked URLs.

8. The system of claim 7, wherein the executable instructions further collect user preference from the user prior to accessing the one or more URLs.

9. The system of claim 7, wherein the executable instructions further identify the one or more URLs according to schedule data of the user, a user calendar, activities of daily living (ADL), and data collected from one or more internet of things (IoT) devices associated with the user.

10. The system of claim 7, wherein the executable instructions further use natural language processing (NLP) on text data from one or more data sources to identify an interest level of a user relating to concepts, events, relationships, or a combination thereof.

11. The system of claim 7, wherein the executable instructions further select the one or more URLs linked within an alternative URL according to one or more user preferences.

12. The system of claim 7, wherein the executable instructions further initialize a machine learning operation using the selected feedback to learn and train a machine learning model for classifying the one or more URLs into one of the plurality of classifications.

13. A computer program product for, by a processor, implementing intelligent web navigation in a computing environment, the computer program product comprising a non-transitory computer-readable storage medium having computer-readable program code portions stored therein, the computer-readable program code portions comprising:
   an executable portion that accesses one or more uniform resource locators (URLs) according to a user history of Internet activities, user preferences, one or more current user activities, calendar data, or a combination thereof;
   an executable portion that gathers selected feedback from the user relating to the one or more URLs according to activities of a user performed on the one or more URLs;
   an executable portion that classifies the one or more URLs into one of a plurality of classifications to indicate a degree of relevancy to the user; and
   an executable portion that dynamically opens or closes hyperlinked URLs within the one or more URLs according to the classifying, wherein dynamically opening the hyperlinked URLs includes, upon the one or more URLs being opened and prior to opening the hyperlinked URLs, preloading content behind the hyperlinked URLs contained within the one or more URLs and analyzing the content to determine the degree of relevancy to the user; and an executable portion that, commensurate with gathering the selected feedback and subsequent to dynamically opening the hyperlinked URLs according to the analyzation of the content, determines a number of the hyperlinked URLs dynamically opened that the user subsequently closes within a predetermined timeframe, wherein, when the number of the hyperlinked URLs exceeds a predetermined value, the selected feedback includes an indication used during the classification that the degree of relevancy is invalid and failed to determine relevance for the number of the hyperlinked URLs.

14. The computer program product of claim 13, further including an executable portion that collects user preference from the user prior to accessing the one or more URLs.

15. The computer program product of claim 13, further including an executable portion that identifies the one or more URLs according to schedule data of the user, a user calendar, activities of daily living (ADL), and data collected from one or more internet of things (IoT) devices associated with the user.

16. The computer program product of claim 13, further including an executable portion that uses natural language processing (NLP) on text data from one or more data sources to identify an interest level of a user relating to concepts, events, relationships, or a combination thereof.

17. The computer program product of claim 13, further including an executable portion that selects the one or more URLs linked within an alternative URL according to one or more user preferences.

18. The computer program product of claim 13, further including an executable portion that initializes a machine learning operation using the selected feedback to learn and train a machine learning model for classifying the one or more URLs into one of the plurality of classifications.

* * * * *